United States Patent
Arroyo et al.

(10) Patent No.: US 11,810,380 B2
(45) Date of Patent: Nov. 7, 2023

(54) METHODS AND APPARATUS TO DECODE DOCUMENTS BASED ON IMAGES USING ARTIFICIAL INTELLIGENCE

(71) Applicant: NIELSEN CONSUMER LLC, Chicago, IL (US)

(72) Inventors: Roberto Arroyo, Guadalajara (ES); Jose Javier Yebes Torres, Valladolid (ES); Aitor Aller Beascoechea, Madrid (ES); Francisco Javier Delgado del Hoyo, Laguna de Duero (ES); Dayron Rizo Rodriguez, Oldsmar, FL (US); Ravindra Gadde, Oldsmar, FL (US)

(73) Assignee: NIELSEN CONSUMER LLC, Chicago, IL (US)

( * ) Notice: Subject to any disclaimer, the term of this patent is extended or adjusted under 35 U.S.C. 154(b) by 92 days.

(21) Appl. No.: 17/075,675

(22) Filed: Oct. 20, 2020

(65) Prior Publication Data
US 2021/0406533 A1 Dec. 30, 2021

Related U.S. Application Data

(60) Provisional application No. 63/046,644, filed on Jun. 30, 2020.

(51) Int. Cl.
*G06V 30/413* (2022.01)
*G06F 16/583* (2019.01)
(Continued)

(52) U.S. Cl.
CPC ........ *G06V 30/413* (2022.01); *G06F 16/5846* (2019.01); *G06F 40/18* (2020.01);
(Continued)

(58) Field of Classification Search
CPC .. G06V 30/413; G06V 30/412; G06V 30/414; G06F 16/5846; G06F 40/58; G06F 40/18
See application file for complete search history.

(56) References Cited

U.S. PATENT DOCUMENTS

| 5,410,611 A | 4/1995 | Huttenlocher et al. |
| 5,606,690 A | 2/1997 | Hunter et al. |

(Continued)

FOREIGN PATENT DOCUMENTS

| CN | 103123685 A | 5/2013 |
| CN | 104866849 A | 8/2015 |

(Continued)

OTHER PUBLICATIONS

United States Patent and Trademark Office, "Corrected Notice of Allowability," issued in connection with U.S. Appl. No. 16/692,797, dated Apr. 22, 2022, 3 pages.

(Continued)

*Primary Examiner* — Kevin Ky
(74) *Attorney, Agent, or Firm* — HANLEY, FLIGHT & ZIMMERMAN, LLC

(57) ABSTRACT

Methods, apparatus, and articles manufacture to decode documents based on images using artificial intelligence are disclosed. An example apparatus includes a model executor to input an image into a first artificial intelligence (AI)-based model to generate detected columns of text in the image; and input the image into a second AI-based model to classify the detected columns into categories; a cell identifier to identify rows or cells in the detected columns; and a report generator to: link information corresponding to the rows or cells in the detected columns with corresponding categories; and generating a report based on the linked information.

20 Claims, 8 Drawing Sheets

(51) Int. Cl.
    *G06F 40/18* (2020.01)
    *G06F 40/58* (2020.01)
    *G06V 30/412* (2022.01)
    *G06V 30/414* (2022.01)
    *G06N 3/08* (2023.01)

(52) U.S. Cl.
    CPC .............. *G06F 40/58* (2020.01); *G06N 3/08* (2013.01); *G06V 30/412* (2022.01); *G06V 30/414* (2022.01)

(56) References Cited

U.S. PATENT DOCUMENTS

| | | |
|---|---|---|
| 7,454,063 B1 | 11/2008 | Kneisl et al. |
| 7,792,709 B1 | 9/2010 | Trandal et al. |
| 8,787,695 B2 | 7/2014 | Wu et al. |
| 8,983,170 B2 | 3/2015 | Nepomniachtchi et al. |
| 9,014,432 B2 | 4/2015 | Fan et al. |
| 9,158,744 B2 | 10/2015 | Rao et al. |
| 9,239,952 B2 | 1/2016 | Hsu et al. |
| 9,290,022 B2 | 3/2016 | Makabe |
| 9,298,979 B2 | 3/2016 | Nepomniachtchi et al. |
| 9,323,135 B1 | 4/2016 | Veloso |
| 9,324,073 B2 | 4/2016 | Nepomniachtchi et al. |
| 9,384,389 B1 | 7/2016 | Sankaranarayanan et al. |
| 9,396,540 B1 | 7/2016 | Sampson |
| 9,684,842 B2 | 6/2017 | Deng |
| 9,710,702 B2 | 7/2017 | Nepomniachtchi et al. |
| 9,747,504 B2 | 8/2017 | Ma et al. |
| 9,760,786 B2 | 9/2017 | Sahagun et al. |
| 9,824,270 B1 | 11/2017 | Mao |
| 10,032,072 B1 | 7/2018 | Tran et al. |
| 10,157,425 B2 | 12/2018 | Chelst et al. |
| 10,235,585 B2 | 3/2019 | Deng |
| 10,395,772 B1 | 8/2019 | Lucas et al. |
| 11,321,956 B1 * | 5/2022 | Geng ................... G06F 40/30 |
| 11,410,446 B2 | 8/2022 | Shanmuganathan et al. |
| 11,625,930 B2 | 4/2023 | Rodriguez et al. |
| 2002/0037097 A1 | 3/2002 | Hoyos et al. |
| 2003/0185448 A1 | 10/2003 | Seeger et al. |
| 2006/0232619 A1 | 10/2006 | Otsuka et al. |
| 2007/0041642 A1 | 2/2007 | Romanoff et al. |
| 2010/0306080 A1 | 12/2010 | Trandal et al. |
| 2011/0122443 A1 | 5/2011 | Otsuka et al. |
| 2011/0243445 A1 | 10/2011 | Uzelac et al. |
| 2011/0289395 A1 | 11/2011 | Breuel et al. |
| 2011/0311145 A1 | 12/2011 | Bem et al. |
| 2012/0183211 A1 | 7/2012 | Hsu et al. |
| 2012/0274953 A1 | 11/2012 | Makabe |
| 2012/0330971 A1 | 12/2012 | Thomas et al. |
| 2013/0058575 A1 | 3/2013 | Koo et al. |
| 2013/0170741 A9 | 7/2013 | Hsu et al. |
| 2014/0002868 A1 | 1/2014 | Landa et al. |
| 2014/0064618 A1 | 3/2014 | Janssen, Jr. |
| 2014/0195891 A1 | 7/2014 | Venkata Radha Krishna Rao et al. |
| 2015/0169951 A1 | 6/2015 | Khintsitskiy et al. |
| 2015/0254778 A1 * | 9/2015 | Kmak ................... G06Q 40/06 705/36 R |
| 2016/0125383 A1 | 5/2016 | Chan et al. |
| 2016/0203625 A1 | 7/2016 | Khan et al. |
| 2016/0210507 A1 | 7/2016 | Abdollahian |
| 2016/0234431 A1 | 8/2016 | Kraft et al. |
| 2016/0307059 A1 | 10/2016 | Chaudhury et al. |
| 2016/0342863 A1 | 11/2016 | Kwon et al. |
| 2017/0293819 A1 | 10/2017 | Deng |
| 2018/0005345 A1 | 1/2018 | Apodaca et al. |
| 2018/0060302 A1 | 3/2018 | Liang et al. |
| 2019/0050639 A1 | 2/2019 | Ast |
| 2019/0171900 A1 | 6/2019 | Thrasher et al. |
| 2019/0325211 A1 | 10/2019 | Ordonez et al. |
| 2019/0332662 A1 | 10/2019 | Middendorf et al. |
| 2019/0354818 A1 | 11/2019 | Reisswig et al. |
| 2020/0097718 A1 | 3/2020 | Schafer |
| 2020/0142856 A1 | 5/2020 | Neelamana |
| 2020/0151444 A1 | 5/2020 | Price et al. |
| 2020/0175267 A1 | 6/2020 | Schafer et al. |
| 2020/0249803 A1 * | 8/2020 | Sobel .................... G06F 16/248 |
| 2020/0401798 A1 * | 12/2020 | Foncubierta Rodriguez ............... G06T 7/70 |
| 2020/0410231 A1 | 12/2020 | Chua et al. |
| 2021/0019287 A1 * | 1/2021 | Prasad ................ G06F 16/2282 |
| 2021/0034856 A1 * | 2/2021 | Torres .................. G06V 30/414 |
| 2021/0090694 A1 | 3/2021 | Colley et al. |
| 2021/0117665 A1 | 4/2021 | Simantov et al. |
| 2021/0117668 A1 * | 4/2021 | Zhong ................... G06N 3/044 |
| 2021/0149926 A1 * | 5/2021 | Komninos ............ G06F 16/283 |
| 2021/0158038 A1 | 5/2021 | Shanmuganathan et al. |
| 2021/0248420 A1 * | 8/2021 | Zhong ................... G06V 10/82 |
| 2021/0295101 A1 | 9/2021 | Tang et al. |
| 2021/0319217 A1 * | 10/2021 | Wang .................. G06V 10/763 |
| 2021/0343030 A1 | 11/2021 | Sagonas et al. |
| 2021/0406533 A1 * | 12/2021 | Arroyo ............... G06V 30/413 |
| 2022/0114821 A1 | 4/2022 | Arroyo et al. |
| 2022/0189190 A1 | 6/2022 | Arroyo et al. |
| 2022/0383651 A1 | 12/2022 | Shanmuganathan et al. |
| 2022/0397809 A1 | 12/2022 | Talpade et al. |
| 2022/0414630 A1 | 12/2022 | Yebes Torres et al. |
| 2023/0004748 A1 | 1/2023 | Rodriguez et al. |
| 2023/0005286 A1 | 1/2023 | Torres et al. |
| 2023/0008198 A1 | 1/2023 | Gadde et al. |
| 2023/0196806 A1 | 6/2023 | Ramalingam et al. |

FOREIGN PATENT DOCUMENTS

| | | |
|---|---|---|
| CN | 108229397 A | 6/2018 |
| CN | 109389124 A | 2/2019 |
| CN | 112446351 A | 3/2021 |
| CN | 112560862 A | 3/2021 |
| DE | 202013005144 | 10/2013 |
| JP | H0749529 | 2/1995 |
| JP | 2008021850 | 9/2008 |
| JP | 2019139737 A | 8/2019 |
| KR | 10-1831204 | 2/2018 |
| WO | 2013044145 | 3/2013 |
| WO | 2018201423 | 8/2018 |
| WO | 2020194004 | 10/2020 |
| WO | 2022123199 | 6/2022 |

OTHER PUBLICATIONS

International Searching Authority, "International Preliminary Report on Patentability," mailed in connection with International Patent Application No. PCT/US2020/061269, dated May 17, 2022, 5 pages.

Devlin et al. "BERT: Pre-training of Deep Bidirectional Transformers for Language Understanding," May 24, 2019, 16 pages.

Google, "Detect Text in Images," Mar. 29, 2021, 20 pages. Retrieved from http://cloud.google.com/vision/docs/ocr.

Joulin et al. "Bag of Tricks for Efficient Text Classification," Aug. 9, 2016, 5 pages.

Krizhevsky et al. "ImageNet Classification with Deep Convolutional Neural Networks," Communications of the ACM, May 2017, 9 pages.

Qasim et al., "Rethinking Table Recognition using Graph Neural Networks," Jul. 3, 2019, 6 pages.

Redmon et al., "You Only Look Once: Unified, Real-time Object Detection," May 9, 2016, 10 pages.

Ren et al., "Faster R-CNN: Towards Real-time Object Detection with Region Proposal Networks," Jan. 6, 2016, 14 pages.

Nshuti, "Mobile Scanner and OCR (A First Step Towards Receipt to Spreadsheet)," 2015, 3 pages.

O'Gorman et al., "Document Image Analysis," IEEE Computer Society Executive Briefings, 2009, 125 pages.

International Searching Authority, "Search Report and Written Opinion," issued in connection with Application No. PCT/US2021/039931, dated Nov. 4, 2021, 7 pages.

Genereux et al., "NLP Challenges in Dealing with OCR-ed Documents of Derogated Quality," Workshop on Replicability and Repro-

(56) References Cited

OTHER PUBLICATIONS ducibility in Natural Language Processing: adaptive methods, resources and software at IJCAI 2015, Jul. 2015, 6 pages.

Govindan et al., "Character Recognition—A Review," Pattern Recogntion, vol. 23, pp. 671-683, 1990, 13 pages.

Lecun et al.," Deep Learning," Nature, vol. 521, pp. 436-444, May 28, 2015, 9 pages.

Kim et al., "Character-Aware Neural Language Models," Proceedings of the Thirtieth AAAI Conference on Artificial Intelligence (AAAI16), pp. 2741-2749, 2016, 9 pages.

Wikipedia, "Precision and Recall," Dec. 17, 2018 revision, 8 pages.

Xu et al., "LayoutLM: Pre-training of Text and Layout for Document Image Understanding," in International Conference an Knowledge Discovery & Data Mining (SIGKDD), 2020, 9 pages, [retrieved from: https://arxiv.org/pdf/1912.13318.pdf].

Hui, "mAP (mean Average Precision) for Object Detection," Mar. 6, 2018, 2 pages. Retrieved from [https://medium.com/@jonathan_hui/map-mean-average-precision-for-object-detection-45c121a31173] on May 11, 2020, 2 pages.

Artificial Intelligence & Image Analysis, "Historic Document Conversion," Industry Paper, accessed on Jan. 30, 2019, 4 pages.

Artificial Intelligence & Image Analysis, "Intelligent Automation Eliminates Manual Data Entry From Complex Documents," White Paper, accessed on Jan. 30, 2019, 3 pages.

Vogel, "Parallel Implementations of Word Alignment Tool," Software Engineering, Testing, and Quality Assurance for Natural Language Processing, pp. 49-57, Jun. 2008, 10 pages.

International Searching Authority, "International Search Report," mailed in connection with International Patent Application No. PCT/US2020/061269, dated Mar. 11, 2021, 3 pages.

International Searching Authority, "Written Opinion," mailed in connection with International Patent Application No. PCT/US2020/061269, dated Mar. 11, 2021, 4 pages.

United States Patent and Trademark Office, "Non-Final Office Action," issued in connection with U.S. Appl. No. 16/692,797, dated Mar. 16, 2021, 12 pages.

United States Patent and Trademark Office, "Final Office Action," issued in connection with U.S. Appl. No. 16/692,797, dated Oct. 27, 2021, 14 pages.

International Searching Authority, "International Search Report," mailed in connection with International Patent Application No. PCT/IB2019/000299, dated Dec. 23, 2019, 3 pages.

International Searching Authority, "Written Opinion," mailed in connection with International Patent Application No. PCT/IB2019/000299, dated Dec. 23, 2019, 4 pages.

Bartz et al., "STN-OCT: A Single Neural Network for Text Detection and Text Recognition," Computer Science, Jul. 27, 2017, 9 pages.

Ozhiganov, "Deep Dive Into OCR for Receipt Recognition," DZone, Jun. 21, 2017, 18 pages.

Akbik et al., "Contextual String Embeddings for Sequence Labeling," In Proceedings of the 27th International Conference on Computational Linguistics (COLING), pp. 1638-1649, 2018, 12 pages.

Bojanowski et al., "Enriching Word Vectors with Subword Information," In Journal Transactions of the Association for Computational Linguistics, vol. 5, pp. 135-146, 2017, 12 pages.

Oliveira et al., "dhSegment: A generic deep-learning approach for document segmentation," In 16th International Conference on Frontiers in Handwriting Recognition (ICFHR), 2019, 6 pages.

DeepDive, "Distant Supervision" 2021, 2 pages, [available online on Stanford University website, http://deepdive.stanford.edu/distant_supervision].

Ronneberger et al., "U-Net: Convolutional Networks for Biomedical Image Segmentation," Medical Image Computing and Computer-Assisted Intervention (MICCAI), 2015, 8 pages.

United States Patent and Trademark Office, "Notice of Allowance and Fee(s) Due," issued in connection with U.S. Appl. No. 16/692,797, dated Apr. 5, 2022, 10 pages.

Lowe, "Distinctive Image Features from Scale-Invariant Keypoints," International Journal of Computer Vision (IJCV), Jan. 5, 2004, 28 pages.

Konda et al., "Magellan: Toward Building Entity Matching Management Systems Over Data Science Stacks," Proceedings of the VLDB Endowment, vol. 9, No. 13, 2016, 4 pages.

Levenshtein, "Binary Codes Capable of Correcting Deletions, Insertions, and Reversals," Soviet Physics Doklady, Cybernetics and Control Therory, pp. 707-710, vol. 10, No. 8, Feb. 1966, 4 pages.

Mudgal et al., "Deep Learning for Entity Matching: A Design Space Exploration," In Proceedings of the 2018 International Conference on Management of Data, 2018, Houston, TX, 16 pages.

Marinai, "Introduction to Document Analysis and Recognition," Machine Learning in Document Analysis and Recognition, 2008, 22 pages.

Zhong et al., "PubLayNet: largest dataset ever for document layout analysis," In International Conference on Document Analysis and Recognition (ICDAR), 2019, 8 pages.

Smith et al., "Identification of Common Molecular Subsequences," Journal of Molecular Biology, Academic Press Inc. (London) Ltd., pp. 195-197, 1981, 4 pages.

Github, "Tesseract OCR" Tesseract Repository on GitHub, 2020, 4 pages, [available online, https://github.com/tesseract-ocr/].

Vaswani et al., "Attention is all you need," In Advances in Neural Information Processing Systems, 31st Conference on Neural Information Processing Systems (NIPS 2017), Long Beach, CA, 2017, 11 pages.

United States Patent and Trademark Office, "Advisory Action," issued in connection with U.S. Appl. No. 16/692,797, dated Feb. 16, 2022, 4 pages.

Follmann et al., "MVTec D2S: Densely Segmented Supermarket Dataset," In European Conference on Computer Vision (ECCV), 2018, 17 pages.

Osindero et al., "Recursive Recurrent Nets with Attention Modeling for OCR in the Wild," in Conference on Computer Vision and Pattern Recognition (CVPR), 2016, 10 pages.

NielsenIQ Brandbank, "Nielsen Brandbank Product Library," Online Available. Retrieved on Apr. 1, 2022, 5 pages. [retrieved from: https://www.brandbank.com/us/product-library/].

Ray et al., "U-PC: Unsupervised Planogram Compliance," in European Conference on Computer Vision (ECCV), 2018, 15 pages, [retrieved from: http://openaccess.thecvf.com/content_ECCV_2018/papers/Archan_Ray_U-PC_Unsupervised_Planogram_ECCV_2018_paper.pdf].

Appalaraju et al., "DocFormer: End-to-End Transformer for Document Understanding," arXiv (CoRR), 2021, 22 pages. [retrieved from: https://arxiv.org/pdf/2106.11539.pdf].

Hong et al., "BROS: A Pre-trained Language Model Focusing on Text and Layout for Better Key Information Extraction from Documents," arXiv (CoRR), 2021, 13 pages, [retrieved from: https://arxiv.org/pdf/2108.04539.pdf].

Hwang et al., "Spatial Dependency Parsing for Semi-Structured Document Information Extraction," in International Joint Conference on Natural Language Processing (IJCNLP), 2021, 14 pages, [retrieved from: https://arxiv.org/pdf/2005.00642.pdf].

Shen et al., "LayoutParser: A Unified Toolkit for Deep Learning Based Document Image Analysis," in International Conference on Document Analysis and Recognition (ICDAR), 2021, 16 pages, [retrieved from: https://arxiv.org/odf/2103.15348.pdf].

Wick et al., "Calamari—A High-Performance Tensorflow-based Deep Learning Package for Optical Character Recognition," Digital Humanities Quarterly, 2020, 12 pages, [retrieved from: https://arxiv.org/ftp/arxiv/papers/1807/1807.02004.pdf].

Yu et al., "PICK: Processing Key Information Extraction from Documents using Improved Graph Learning-Convolutional Networks," in International Conference on Pattern Recognition (ICPR), 2020, 8 pages, [retrieved from https://arxiv.org/pdf/2004.07464.pdf].

Zacharias et al., "Image Processing Based Scene-Text Detection and Recognition with Tesseract," arXiv (CoRR), 2020, 6 pages, [retrieved from: https://arxiv.org/pdf/2004.08079.pdf].

(56) References Cited

OTHER PUBLICATIONS

International Searching Authority, "International Preliminary Report on Patentability" mailed in connection with International Patent Application No. PCT/IB2019/000299, dated Sep. 28, 2021, 5 pages.
Github, "Doccano tool," Github.com, downloaded on Apr. 1, 2022, 12 pages, [retrieved from: https://github.com/doccano/doccano].
Github, "FIAT tool—Fast Image Data Annotation Tool," Github. com, downloaded on Apr. 1, 2022, 30 pages, [retrieved from: https://github.com/christopher5106/FastAnnotationTool].
Datasetlist, "Labeling tools—List of labeling tools," Datasetlist. com, updated Dec. 2021, downloaded on Apr. 1, 2022, 12 pages [retrieved from: https://www.datasetlist.com/tools/].
Xu et al., "LayoutLM: Pre-training of Text and Layout for Document Image Understanding," in International Conference an Knowledge Discovery & Data Mining (SIGKDD), Jun. 16, 2020, 9 pages, [retrieved from: https://arxiv.org/pdf/1912.13318.pdf].
Bojanowski et al., "Enriching Word Vectors with Subword Information," In Journal Transactions of the Association for Computational Linguistics, vol. 5, pp. 135-146, Jun. 2017, 12 pages.
Oliveira et al., "dhSegment: A generic deep-learning approach for document segmentation," In 16th International Conference on Frontiers in Handwriting Recognition (ICFHR), Aug. 14, 2019, 6 pages.
Ronneberger et al., "U-Net: Convolutional Networks for Biomedical Image Segmentation," Medical Image Computing and Computer-Assisted Intervention (MICCAI), May 18, 2015, 8 pages.
Mudgal et al., "Deep Learning for Entity Matching: A Design Space Exploration," In Proceedings of the 2018 International Conference on Management of Data, Jun. 10-15, 2018, Houston, TX, 16 pages.
Zhong et al., "PubLayNet: largest dataset ever for document layout analysis," In International Conference on Document Analysis and Recognition (ICDAR), Aug. 16, 2019, 8 pages.
Zacharias et al., "Image Processing Based Scene-Text Detection and Recognition with Tesseract," arXiv (CoRR), Apr. 17, 2020, 6 pages, [retrieved from: https://arxiv.org/pdf/2004.08079.pdf].
Vaswani et al., "Attention is all you need," In Advances in Neural Information Processing Systems, 31st Conference on Neural Information Processing Systems (NIPS 2017), Long Beach, CA, last revised Dec. 6, 2017, 15 pages.
Osindero et al., "Recursive Recurrent Nets with Attention Modeling for OCR in the Wild," in Conference on Computer Vision and Pattern Recognition (CVPR), Mar. 9, 2016, 10 pages.
European Patent Office, "Communication pursuant to Rules 161(2) and 162 EPC," issued in connection with Application No. 20891012.5, dated Jun. 29, 2022, 3 pages.
United States Patent and Trademark Office, "Non-Final Office Action," issued in connection with U.S. Appl. No. 17/345,940, dated Aug. 18, 2022, 8 pages.
International Searching Authority, "International Search Report and Written Opinion," mailed in connection with International Patent Application No. PCT/US2022/034570, dated Oct. 20, 2022, 8 pages.
European Patent Office, "Extended Search Report," issued in connection with Application No. 19921870.2, dated Oct. 12, 2022, 11 pages.
European Patent Office, "Communication pursuant to Rules 70(2) and 70a(2) EPC," issued in connection with Application No. 19921870.2, dated Nov. 2, 2022, 1 page.
United States and Patent and Trademark Office, "Notice of Allowance and Fee(s) Due," issued in connection with U.S. Appl. No. 17/364,419, dated Nov. 4, 2022, 10 pages.
European Patent Office, "Extended Search Report," issued in connection with Application No. 22180113.7, dated Nov. 22, 2022, 7 pages.
Chen et al., "TextPolar: irregular scene text detection using polar representation" International Journal on Document Analysis and Recognition (IJDAR), published online: May 23, 2021, 9 pages.
United States and Patent and Trademark Office, "Corrected Notice of Allowability," issued in connection with U.S. Appl. No. 17/364,419, dated Nov. 15, 2022, 8 pages.

European Patent Office, "Communication pursuant to Rules 161(2) and 162 EPC," issued in connection with Application No. 19921870.2, dated Nov. 5, 2021, 3 page.
Canadian Patent Office, "Office Action," issued in connection with Application No. 3,124,868, dated Nov. 10, 2022, 4 pages.
Huang et al., "Mask R-CNN with Pyramid Attention Network for Scene Text Detection", arXiv:1811.09058v1, pp. 1-9, https://arxiv.org/absZ1811.09058, Nov. 22, 2018, 9 pages.
Feng et al., "Computer vision algorithms and hardware implementations: A survey", Integration: the VLSI Journal, vol. 39, pp. 309-320, https://www.sciencedirect.com/science/article/pii/S0167926019301762, accepted Jul. 27, 2019, 12 pages.
United States Patent and Trademark Office," Non-Final Office Action," issued in connection with U.S. Appl. No. 17/379,280, dated Dec. 2, 2022, 14 pages.
Li et al., "Extracting Figures and Captions from Scientific Publications," Short Paper, CIKM18, Oct. 22-26, 2018, Torino, Italy, 4 pages.
European Patent Office, "Extended Search Report," issued in connection with Application No. 22184405.3, dated Dec. 2, 2022, 7 pages.
United States and Patent and Trademark Office, "Corrected Notice of Allowability," issued in connection with U.S. Appl. No. 17/364,419, dated Jan. 4, 2023, 2 pages.
United States and Patent and Trademark Office, "Corrected Notice of Allowability," issued in connection with U.S. Appl. No. 17/364,419, dated Feb. 15, 2023, 2 pages.
United Kingdom Patent Office, "Examination Report under section 18(3)," issued in connection with GB Application No. 2112299.9, dated Feb. 17, 2023, 2 pages.
United States and Patent and Trademark Office, "Non-Final Office Action," issued in connection with U.S. Appl. No. 17/883,309, dated Jan. 20, 2023, 14 pages.
International Searching Authority, "International Preliminary Report on Patentability," issued in connection with Application No. PCT/US2021/039931, dated Dec. 13, 2022, 6 pages.
European Patent Office, "Communication Pursuant to Rule 69 EPC," dated Jan. 23, 2023 in connection with European Patent Application No. 22184405.3, 2 pages.
Crandall et al., "Extraction of special effects caption text events from digital video," IJDAR, Department of Computer Science and Engineering, The Pennsylvania State University, 202 Pond Laboratory, University Park, PA, Accepted Sep. 13, 2022, pp. 138-157, 20 pages.
United States Patent and Trademark Office, "Final Office Action," issued in connection with Application No. U.S. Appl. No. 17/379,280, dated May 5, 2023, 17 pages.
United States Patent and Trademark Office, "Non-Final Office Action," issued in connection with U.S. Appl. No. 17/345,940, dated Mar. 16, 2023, 13 pages.
European Patent Center, "Extended European Search Report," issued in connection with Application No. 22214553.4, dated May 17, 2023, 9 pages.
Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.
United States and Patent and Trademark Office, "Notice of Allowance and Fee(s) Due," issued in connection with U.S. Appl. No. 17/883,309, dated May 11, 2023, 14 pages.
Canadian Intellectual Property Office, "Office Action," issued in connection with Application No. 3,124,868, dated Aug. 10, 2023, 5 pages.
Stackoverflow, "How do I make masks to set all of image background, except the text, to white?," modified 4 years, 3 months ago, 7 pages.

\* cited by examiner

METHODS AND APPARATUS TO DECODE DOCUMENTS BASED ON IMAGES USING ARTIFICIAL INTELLIGENCE

RELATED APPLICATION

This patent arises from a U.S. Non-Provisional Patent Application of U.S. Provisional Patent Application No. 63/046,644, which was filed on Jun. 30, 2020. U.S. Provisional Patent Application No. 63/046,644 is hereby incorporated herein by reference in its entirety. Priority to U.S. Provisional Patent Application No. 63/046,644 is hereby claimed.

FIELD OF THE DISCLOSURE

This disclosure relates generally to artificial intelligence, and, more particularly, to methods and apparatus to decode documents based on images using artificial intelligence.

BACKGROUND

In recent years, machine learning and/or artificial intelligence have increased in popularity. For example, machine learning and/or artificial intelligence may be implemented using neural networks. Neural networks are computing systems inspired by the neural networks of human brains. A neural network can receive an input and generate an output. The neural network can be trained (e.g., can learn) based on feedback so that the output corresponds to a desired result. Once trained, the neural network can make decisions to generate an output based on any input. Neural networks are used for the emerging fields of artificial intelligence and/or machine learning.

Figure 1:
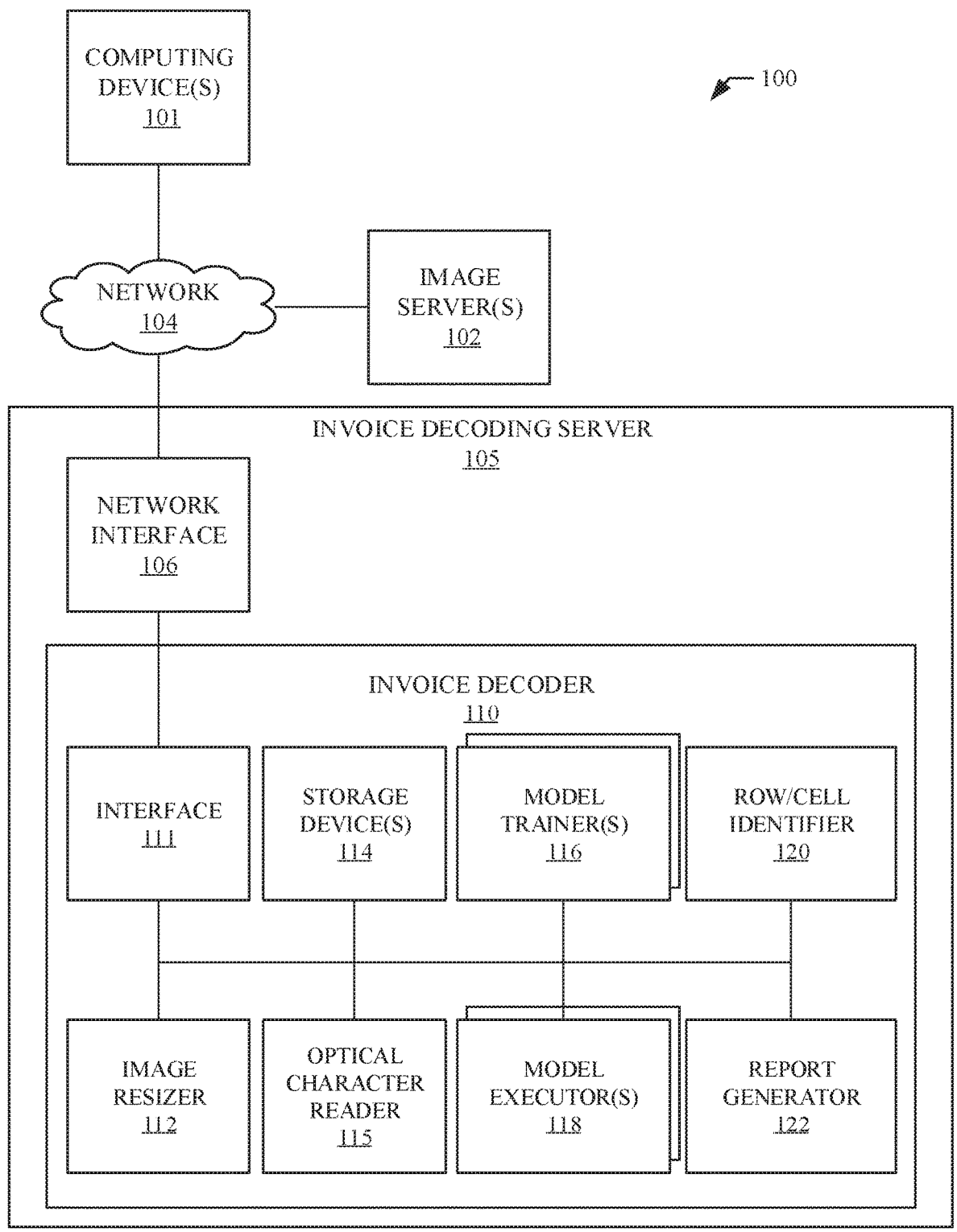
FIG. 1 is an example environment including a block diagram of an example implementation of an invoice decoder to decode text based on images using artificial intelligence.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order, or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Invoices, receipts, logs, timesheets, etc. include printed information regarding the tracking of information (e.g., item(s), purchase of item(s), logs etc.). For example, an invoice and/or receipt may include product name, product description, identifiers, timestamps, pricing information, purchase count, seller information, buyer information, etc. Invoice decoding is used to digitally decode text from images of printed invoices and/or receipts for storage. In this manner, a database can be generated that references printed invoice information, which can be used as a digital reference for the products, companies, buyers, sellers, etc.

Traditional Invoice Recognition system may be used to perform such item coding. For example, images of an invoice may be input into a traditional invoice recognition system to identify/decode particular information in the invoice based on a scan of the image. Using a scanner, the images of the invoices correspond to controlled conditions (e.g., optimal lighting condition, background conditions, focus, glair, framing, etc.). However, because the cost and time to generate such high scans is high, the volume of such high quality images is low.

The volume of non-scanned images of invoices and/or receipts, such as images taken by consumers and/or auditors, is high. However, such images tend to be lower quality than scanned images. For example, images taken (e.g., captured by a camera and/or smartphone), rather than scanned (e.g., with a flatbed and/or sheet-fed scanner), tend to have inferior lighting, focus, framing, resolution, background conditions, glare, etc. However, traditional invoice recognition systems struggle to accurately decode invoices in non-scanned images. Further, although invoice recognition systems may identify the text in a document, invoice recognition systems do not decode invoices to be able to identify and/or report tracking information (e.g., types items purchased, cost of item and/or total cost, quantity of items purchased, etc.).

Examples disclosed herein facilitate invoice decoding that results in a higher efficacy and/or accuracy than traditional methods for non-ideal images of invoices and/or receipts. Examples disclosed herein include natural language processing, computer vision, and deep learning to decode invoices and/or receipts. Examples disclosed herein extract purchase facts from an invoice/receipt image using object detection and text classification to recognize product tables and the columns, rows, and cells of the product tables. In this manner, a user can take an image of an invoice or receipt, and examples disclosed herein can process the image to convert the data in the image into digital data that can be given to the user immediately and/or stored in a database.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a region-based convolutional neural network model is used. In general, machine learning models/architectures that are suitable to use in the example approaches disclosed herein will be neural network based models (e.g., convolution neural network (CNN), deep neural network (DNN), etc.) including explainability to be able to determine which factors were important for the neural network based model in generating an output. However, other types of machine learning models could additionally or alternatively be used such as deep learning and/or any other type of AI-based model.

In general, implementing a ML/AI system involves two phases, a learning/training phase, and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs). As used herein, inputs with corresponding labeled outputs is referred to as training data.

In examples disclosed herein, ML/AI models are trained using images that have been labelled with column detection information to identify columns based on images of invoices and/or receipts. However, any other training algorithm may additionally or alternatively be used. In examples disclosed herein, training is performed until an acceptable amount of error is achieved. In examples disclosed herein, training is performed at a server of a controlling entity and/or by a user of a processing device. Training is performed using hyperparameters that control how the learning is performed (e.g., a learning rate, a number of layers to be used in the machine learning model, etc.). In some examples re-training may be performed. Such re-training may be performed in response to additional training data.

Training is performed using training data. In examples disclosed herein, the training data originates from processing devices and/or servers on a network. Because supervised training is used, the training data is labeled. Labeling is applied to the training data by the entity, the server, or a user of a processing device.

Once training is complete, the model is deployed for use as an executable construct that processes an input and provides an output based on the network of nodes and connections defined in the model. The model is stored at the server of the entity. The model may then be executed by a processing device and/or a server to decode invoices based on input images.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 is an example environment 100 for decoding images with text (e.g., invoices, receipts, etc.). The example environment 100 includes example computing device(s) 101, example image service(s) 102, an example network 104, an example invoice decoding server 105, an example network interface 106, and an example invoice decoder 110. The example invoice decoder 110 includes an example interface 111, an example image resizer 112, example storage device(s) 114, an example model trainer(s) 116, an example model executor(s) 118, an example row/cell identifier 120, and an example report generator 122.

The example computing device(s) 101 of FIG. 1 is/are devices that include a sensor (e.g., a camera) to capture an image. For example, the computing device(s) 101 may be a mobile phone, a computer, a camera, a video camera, and/or any other computing device that includes and/or is in communication with (e.g., via a wired or wireless connection) an image capturing sensor. A user can utilize the computing device(s) 101 to take an image of document with text (e.g., an invoice, a receipt, etc.) on it and transmit the image to the example invoice decoding server 105 via the example network 104. Accordingly, the images captured by the computing device(s) 101 can be crowdsourced images. The example image server(s) 102 of FIG. 1 store(s) and/or obtain(s) images from any source. For example, the image server(s) 102 may include a database of images of receipts, invoices, etc. The example image server(s) 102 may obtain image(s) from the computing device(s) 101 and/or from any other device. In some examples, the image server(s) 102 include(s) training data that can be transmitted to the invoice decoding server 105 via the network 104.

The example network 104 of FIG. 1 is a system of interconnected systems exchanging data. The example network 104 may be implemented using any type of public or private network such as, but not limited to, the Internet, a telephone network, a local area network (LAN), a cable network, and/or a wireless network. To enable communication via the network 104, the example computing device(s) 101, the example image server(s) 102, and the invoice decoding server 105 include a communication interface that enables a connection to an Ethernet, a digital subscriber line (DSL), a telephone line, a coaxial cable, or any wireless connection, etc.

The example invoice decoding server 105 includes the example network interface 106 to obtain images via the example network 104. The example invoice decoding server 105 further includes the invoice decoder 110. Although the invoice decoder 110 is included in the invoice decoding server 105, the example invoice decoder 110 may be implemented in any device (e.g., the computing devices(s) 101 and/or the image server(s) 102)) to identify decode text (e.g., from images of invoices, receipts, etc.).

The example interface 111 of FIG. 1 obtains images of invoices and/or receipts (e.g., from the network interface 106 when implemented in the invoice decoding server 105 and/or from a sensor or storage when implemented in the computing device 101 and/or the image server 102). The interface 111 may obtain the images may be from the computing device 101 and/or the image server 102 via the network 104. The interface 111 may obtain training images (e.g., images that have been prelabelled with the corresponding classification for training purposes) and/or images to be classified (e.g., after the invoice decoding model has been trained). The interface 101 transmits the obtained image to the example image resizer 112.

The example image resizer 112 of FIG. 1 receives an image (e.g., from the interface 111) and resizes the image to a predefined size. Because the images may be from different sources (e.g., different cameras, taken with different resolutions, from different types of devices, etc.), the images may be sized to different sizes. The example image resizer 112 resizes the image to a predefined size so that the size of all the images being processed are uniform.

The example storage device(s) 114 of FIG. 1 store(s) the validated training data (e.g., pre-classified images known as ground truth data) and/or images to be classified. Additionally, the example storage device(s) 114 may store trained model data. The trained model data corresponds to the parameters for implementing a trained model (e.g., hyper-parameters, weights for neurons, algorithms, etc.). In this manner, the model executor 118 can implement a trained model using newly obtained images to decode invoices included in the image. The example storage device(s) 114 may be separate storage devices (e.g., one for the training data, one for trained model data), may be a single storage device (e.g., for both the training data and/or the trained model data), and/or any combination thereof.

The example model trainer(s) 116 of FIG. 1 trains a model(s), such as (but not limited to) an example column detection model (e.g., region-based AI model(s), region-based neural network(s), region-based machine learning model(s), region-based deep learning model(s), region-based convolution neural network(s), and/or any other region-based type(s) of AI-based model(s) and/or network(s)) stored in the example storage device(s) 114. Initially, a model(s) is/are untrained (e.g., the neurons are not yet weighted). To train the column detection model (e.g., a model that identifies columns in a table), the example model trainer 116 of FIG. 1 weights parameters of the AI-based model portion of the model (e.g., neurons of a neural network) to configure the model to detect columns in an invoice, a receipt, etc. by generating bounding boxes corresponding to regions of interest in the image and classify the regions of interest as columns or non-columns. As described above, the model trainer 116 may train a model with a first set of training data and test the model with a second set of the training data. If, based on the results of the testing, the accuracy of the model is below a threshold, the model trainer 116 can tune (e.g., adjust, further train, etc.) the parameters of the model using additional sets of the training data and continue testing until the accuracy is above the threshold.

Additionally, the example model trainer(s) 116 of FIG. 1 trains another example model to classify headers (e.g., column types of the columns) to link data (e.g., a header classification model, a column type classification model, etc.). The column/header type corresponds to the type of information that is listed in the column. For example, the column/header type may be item description, item quantity, item total price, etc. In some examples, columns that are not considered (e.g., based on user and or manufacturer preferences) are tagged as an "out of scope" class. The headers for the columns correspond to a first row in a detected table, as discussed in further detail below. The column type classification model can be executed to classify detected column headers (e.g., header types) to link text in the column to the header type. The example model trainer 116 trains the column type classification model using natural language processing to check whether text in a given header maps to one of the column types of interest. The example model trainer 116 assigns one of the multiple column types to the text of the column header (e.g., word, sentence, text pieces, etc.). The model trainer 116 builds such classifiers in machine learning (e.g., learning classification rules from examples). The example model trainer 116 builds the classifiers with labeled data, which includes different possible header text for each category (e.g., column type). The categories identify a type of information included in the detected columns. For example, a category may be "item description," "item quantity," "item price," etc. In this manner, any text in a cell under a column categorized as item description relates the description of an item. The model trainer 116 uses training data from different labels that different suppliers may use for column headers labelled with the class of the header. Thus, the trained model will predict the column type based on an image of an invoice, a receipt, etc. After the models are trained, the storage device(s) 114 may store the model training data (e.g., corresponding to how to implement the trained models (e.g., the weights to apply to the neurons to decode invoices based on the training)) and/or the interface 111 may deploy the model data to another device (e.g., so that the device can implement the trained models). The model trainer(s) 116 may be implemented by a single trainer (e.g., to train both the column type classification model and the column detection model (e.g., a region-CNN (RCNN)) or may be implemented by separate trainers (e.g., a first trainer to train the column type classification model and a second trainer to train the column detection model (e.g., a RCNN)). The training process is further described below in conjunction with FIG. 3.

The example model executor(s) 118 of FIG. 1 implement(s) a trained and/or deployed model(s) to take input images, detect columns in a table(s) of the images (e.g., using a trained model) and classify column in categories (e.g., using a trained model) based on rows and/or cells detected in the table. For example, the model executor 118 obtains an image of an invoice, a receipt, etc. and outputs values or percentages corresponding to the likelihood that the image includes one or more columns of interest the model has been trained to identify. The example model executor 118 can implement a column detection model to detect columns in an input image by detecting regions (e.g., bounding boxes) and classifying the bounding boxes as columns. The example model executor 118 can implement the column type classification model to classify identified columns into column types, as described above. For example, the model executor 118 can implement the column type classification model to use character n-grams to classify headers that include descriptive words that may include typos from traditional OCR techniques. The model executor(s) 118 may be implemented by a single executor (e.g., to execute both the column type classification model and the column detection model (e.g., using a region-CNN (RCNN)) or may be implemented by separate executors (e.g., a first executor to execute the column type classification model and a second executor to execute the column detection model (e.g., using a RCNN)). An example implementation of the model(s) is further described below in conjunction with FIG. 4.

The example row/cell identifier 120 of FIG. 1 identifies rows and/or cells within columns identified by the model executor 118 when executing the column detection model to identify columns from the image of the invoice. The example row/cell identifier 120 receives the detected columns, which are represented by region bounding boxes, and sorts the region bounding boxes horizontally. The row/cell identifier 120 also receives words extracted by optical character recognition (OCR). The words are not sorted. The row/cell identifier 120 sorts the words by grouping bounding boxes of the words by column. For example, the row/cell identifier 120 can determine that a first bounding box of a first words belongs to a first group of words corresponding to a first column by determining whether an intersection over union of the first bounding box of the first words intersects with the first bounding box by a threshold value (e.g., 0.75). The example row/cell identifier 120 then sorts the words in the respective columns vertically (e.g., using the Y coordinate of the centroid of the word). The example row/cell identifier 120, for the respective columns, iterates through the sorted words to find words that include or are numbers (e.g., integers or floats). The example row/cell identifier 120 stores the Y of the centroid for respective words that include numbers in a temporary variable to detect different rows of the table. The example row/cell identifier 120 counts a number of occurrences of numbers in each column to determine a mode (e.g., the most repeated value (number of occurrences of numbers) among columns, which corresponds to the number of rows of the table). The example row/cell identifier 120 estimates a slope of each row using the median of the most representative column(s) (e.g., the column(s) that includes the mode number of rows). The example row/cell identifier 120 determines boundaries (e.g., column boundaries and row boundaries) of each cell by intersecting respective ones of regions of the column and the rows. The example row/cell identifier 120 determines the row boundaries using the computed slopes. For respective columns, the closest column with the targeted (e.g., mode) number of rows is used as a reference for the column boundary coordinates. The example row/cell identifier 120, for respective cells, extracts the text by concatenating all the words that are within the respective cell boundaries. For example, the row/cell identifier 120 sorts the words in the XY plane using a median height of the respective words as an estimate of line height for grouping the words horizontally. The row/cell identifier 120 (e.g., iteratively) determines that a word is inside of a cell if the Y-coordinate of its centroid is inside the vertical limits (e.g., determined by the line height). The example row/cell identifier 120 determines a header of each column by searching for the first row of the table without numbers. In some examples, the example row/cell identifier 120 determines that the rest of the rows are those that contain at least one number in one of the columns. The first row corresponds to headers of the columns. Thus, the first row can be used to classify the columns (e.g., using the column type classification model. The example row/cell identifier 120 outputs a table with the sorted list of words at each cell. The table is used to fetch contents of columns of interest (e.g., by classifying the columns using the first row and identifying headers of interest).

The example report generator 122 of FIG. 1 generates a report to identify classified invoice(s) or information corresponding to the decoded invoice, receipt, etc. After the columns of an image have been identified, after the rows and/or cells with given columns have been identified, and after the columns have been classified using a first detected row, the example report generator 122 links information corresponding to the identified rows and/or cells to the corresponding column categories. For example, if the text in a row includes "Whiskey" in a first column corresponding to product identifier, a number '3' in a second column corresponding to items purchased, and the text "$150" in a third column corresponding to total cost, the report generator 122 links the item of whiskey to the total number of 3 items purchased and the total cost of $150. The report generator 122 links the amount of '3' to the total number of items purchased and to the whiskey product. After linking the information corresponding to the rows, columns, and column detections, the report generator 122 may generate a report including information identified in the invoice, receipt, etc. (e.g., description, quantity, price, etc.). If additional information is available, the report generator 122 may include the additional information in the report. For example, if the image includes metadata, a file name, and/or user entered data, the report generator 122 may link such data to the invoice and include the linked data the report. The report generator 122 may include the image and/or generated bounding boxes in the report. The report may be a document and/or a data packet that includes the report. The example interface 111 can transmit the report to another device (e.g., a server, an external database, etc.) and/or the storage device(s) 114 may store the report locally.

Figure 2A:
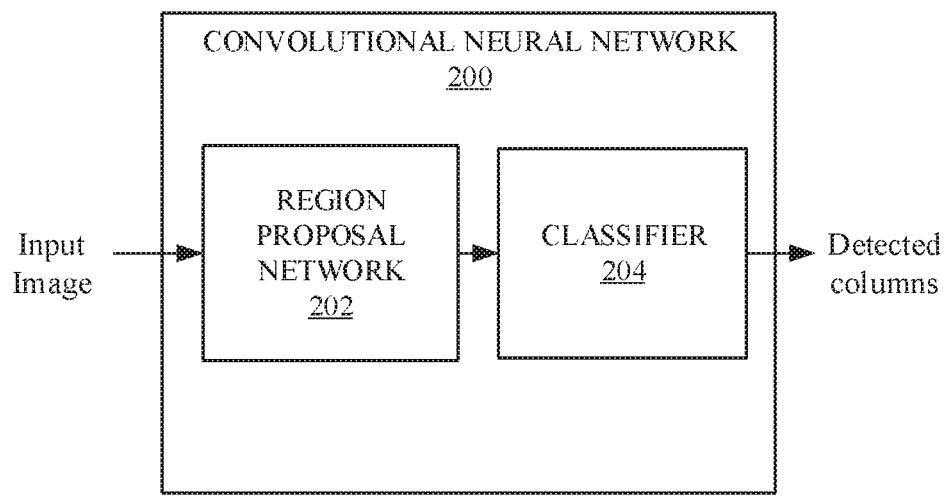
FIG. 2A is an example column detection model that may be trained and/or implemented by the invoice decoder of FIG. 1.

FIG. 2A is an example illustration of an example architecture of the column detection model, which is based on an example region-based convolutional neural network 200, that may be trained by the example model trainer 116 and/or implemented by the example model executor 118 of FIG. 1 to detect columns. The example convolutional neural network 200 includes an example regional proposal network (RPN) 202 and an classifier 204. Accordingly, the example convolutional neural network 200 of FIG. 2A corresponds to a region-based convolutional neural network (R-CNN). The example convolutional neural network 200 of FIG. 2A extracts features from the input images. However, the column detection model may be implemented as a different type of AI-based model.

For example, the column detection model may be implemented using a the convolutional neural network 200 and/or may be implemented using any past, present, and/or future type(s) of AI-based model(s) and/or machine learning structure(s) capable of classifying bounding boxes as columns or non-columns. The example convolutional neural network 200 of FIG. 2A extracts features from the input images. The example convolutional neural network 200 transmits the extracted features to the regional proposal network (RPN) 202 to predict the location of anchors.

The example regional proposal network 202 of FIG. 2A finds regions of interest (e.g., anchors) where a column may be present in an image of an invoice, a receipt, etc. based on the extracted features from the neural network 200. For every point in an image and/or feature, the example regional proposal network 202 learns whether a column is present in an image and/or feature. The example regional proposal network 202 generates several anchors (e.g., bounding boxes) over the input image at different locations. The anchors indicate possible objects in various sizes and aspect ratios at the location (e.g., based on the hyperparameters). The example RPN 202 may perform a non-maximum suppression (NMS) technique to keep regions of interest. The example RPN 202 outputs the example regions (e.g., region bounding boxes, column bounding boxes, etc.) of interest to the example classifier 204.

The example classifier 204 of FIG. 2A classifies the bounding boxes as columns or non-columns based on the input bounding boxes. The classifier 204 of FIG. 1 may be implemented using any past, present, and/or future type(s) of AI-based model(s) and/or machine learning structure(s) capable of classifying bounding boxes as columns or non-columns. Because the classifier 204 is focused on the bounding boxes, as opposed to the entire image, the classifier 204 generates much more accurate results then attempting to decode invoices based on an entire image. The classifier 204 outputs the classification as probabilities that the inputted bounding boxes include one or more invoices columns that the classifier 204 has been trained to identify.

Figure 2B:
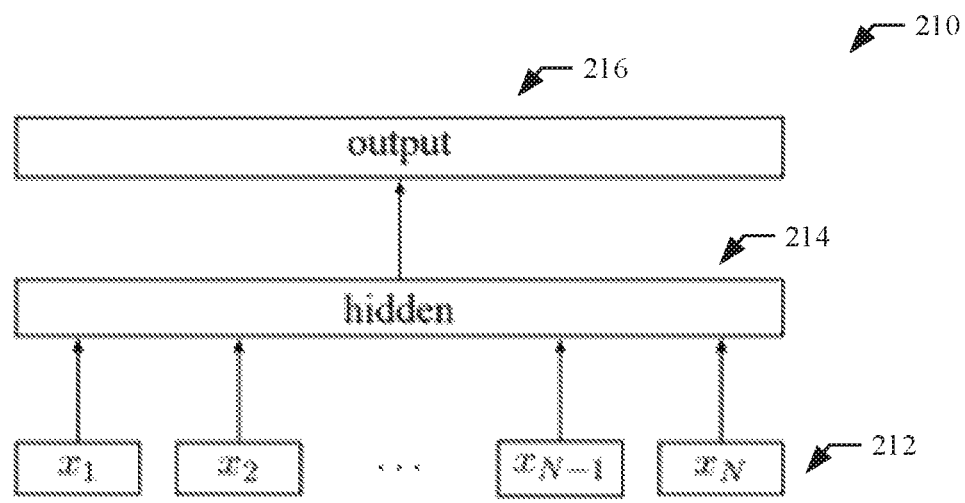
FIG. 2B is an example header classification model that may be trained and/or implemented by the invoice decoder of FIG. 1.

FIG. 2B is an example illustration of a model 210 (e.g., a column type classification model) that may be trained by the example model trainer 116 and/or implemented by the example model executor 118 of FIG. 1 to classify headers. The example model 210 includes example character n-grams 212, an example hidden layer(s) 214, and an example output layer 216. Although the example model 210 is implemented as a natural language processing model, the example model 210 may be any type of model that can classify headers.

The example n-grams 212 of FIG. 2 are words in the headers. For example, the n-grams 212 and/or a bag(s) of words may include "description of product", "item total", "price", "total", etc., which may be in the first row of a table. In some examples, the model 210 includes a bag of words for each class (e.g., category, classification type, etc.), which the n-grams 212 are compared against. For example, words in a call of the first row can be input as n-grams 212 to the model 210 and the example hidden layer(s) 214 classifies the respective column into one or more categories by matching the n-grams 212 to words in the bag(s) of words. In some examples, the bag(s) of words include variations (e.g., including common typos) of the selected header categories (e.g., so that an invoice with "cost", "$", or "pric" are classified with as corresponding to "price"). The example model 210 outputs the output classifications 216 for the headers according to the n grams 212 that match a word(s) in the bag(s) of words.

While an example manner of implementing the example invoice decoder 110 of FIG. 1 is illustrated in FIG. 1, one or more of the elements, processes and/or devices illustrated in FIG. 1 may be combined, divided, re-arranged, omitted, eliminated, and/or implemented in any other way. Further, the example interface 111, the example image resizer 112, the example storage device(s) 114, the example model trainer 116, the example model executor 118, the example row/cell identifier 120, the example report generator 122, and/or, more generally, the example invoice decoder 110 of FIG. 1 may be implemented by hardware, software, firmware and/or any combination of hardware, software and/or firmware. Thus, for example, any of the example interface 111, the example image resizer 112, the example storage device(s) 114, the example model trainer 116, the example model executor 118, the example row/cell identifier 120, the example report generator 122, and/or, more generally, the example invoice decoder 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 111, the example image resizer 112, the example storage device(s) 114, the example model trainer 116, the example model executor 118, the example row/cell identifier 120, the example report generator 122, and/or, more generally, the example invoice decoder 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example invoice decoder 110 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
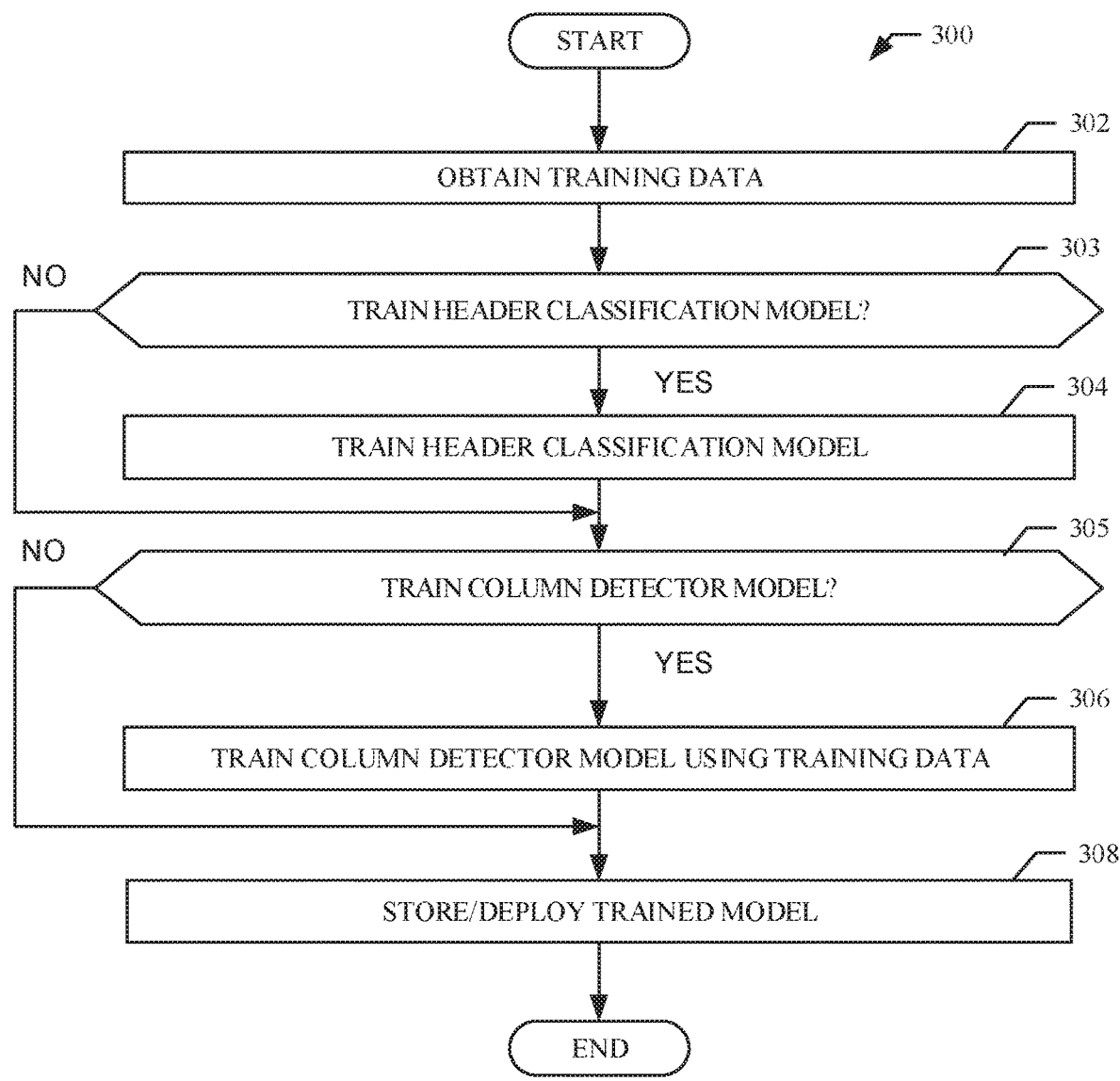
FIG. 3 illustrates a flowchart representative of machine readable instructions which may be executed to implement the invoice decoder of FIG. 1 to train a column detector model and a header classifier model.
Figure 4:
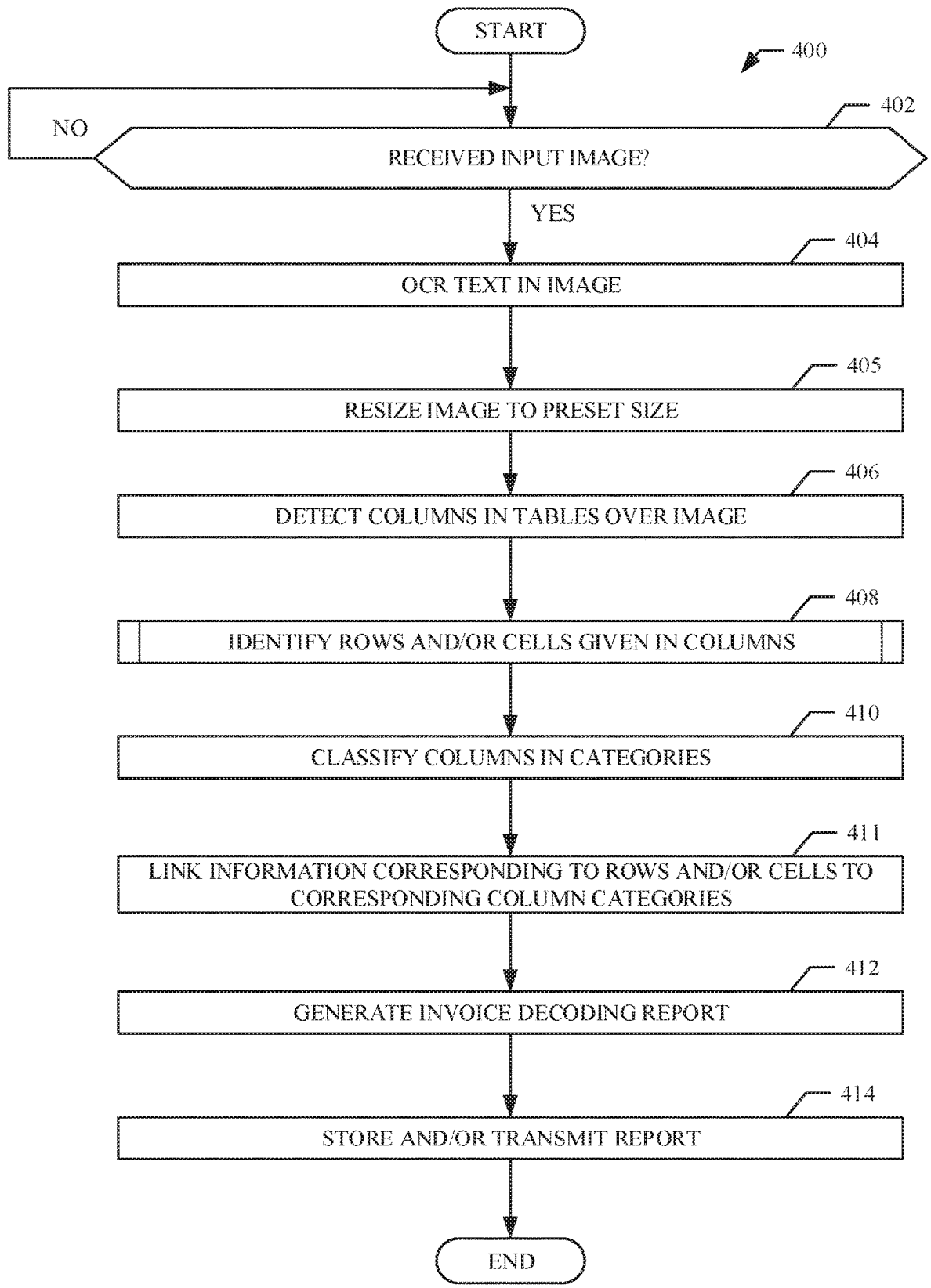
FIGS. 4 and/or 5 illustrate a flowchart representative of machine readable instructions which may be executed to implement the invoice decoder of FIG. 1 to decode an image of a document using a column detector model and a header classifier model.
Figure 5:
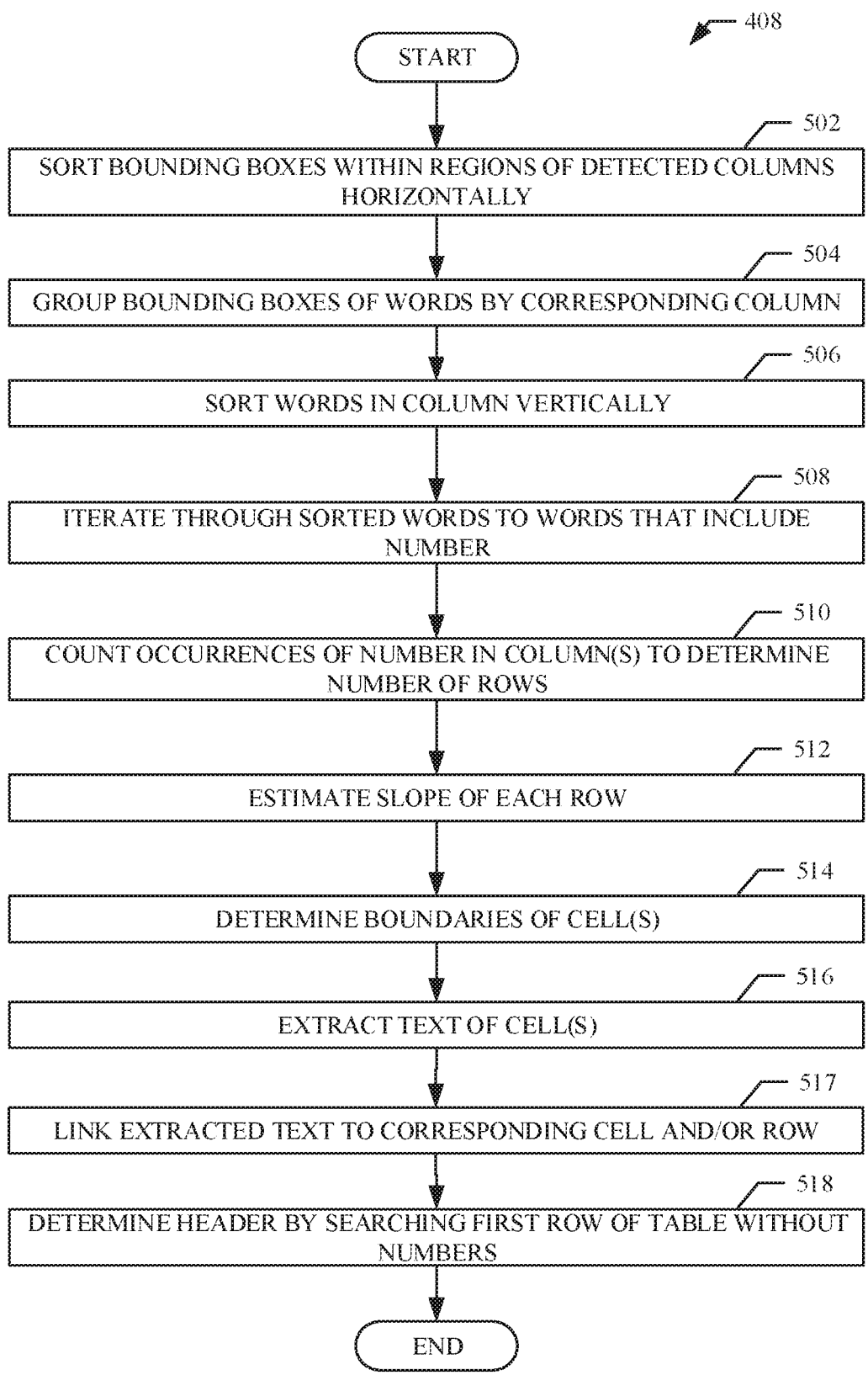

Flowcharts representative of example hardware logic, machine readable instructions, hardware implemented state machines, and/or any combination thereof for implementing the example invoice decoder 110 of FIG. 1 are shown in FIGS. 3-5. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3-5 many other methods of implementing the example invoice decoder 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second", etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 illustrates an example flowchart representative of machine readable instructions 300 that may be executed to implement the example invoice decoder 110 of FIG. 1 to train a model to decode invoices and/or receipts. Although the instructions 300 are described in conjunction with the example invoice decoder 110 of FIG. 1, the instructions 300 may be described in conjunction with any type of invoice decoder. Additionally, although the instructions 300 of FIG. 3 are described in conjunction with decoding invoices and/or receipts, the instructions 300 may be described in conjunction with an image of any object that includes text.

At block 302, model trainer 116 obtains training data from the example storage device(s) 114 and/or the example interface 111. As described above, the training data includes pre-classified images of invoices with known columns. If the training data includes images of different sizes, the example image resizer 112 may resize the images to a uniform size. At block 303, the example model trainer 116 determines if the header classification model is to be trained. If the example model trainer 116 determines that the header classification model is not to be trained (block 303: NO), control continues to block 305. If the example model trainer 116 determines that the header classification model is to be trained (block 303: YES), the example model trainer 116 trains the header/column type classification model (block 304). In some examples, the model trainer 116 may use a bag of words for each class from text of several documents that were manually annotated. In such examples, the model trainer 116 may implement the model 210 of FIG. 2B to classify the headers. In this manner, text in cells that correspond to an identified column/category are linked to the identified header category. For example, if a cell is within a column that is categorized as price, the text within the cell is linked to a price.

At block 305, the example model trainer 116 determines if the column detector model is to be trained. If the example model trainer 116 determines that the column detector model is not to be trained (block 305: NO), control continues to block 308. If the example model trainer 116 determines that the column detector model is to be trained (block 305: YES), the example model trainer 116 trains the model (e.g., the header classification model used to identify columns in an image) using the training data (block 306). For example, the model trainer 116 may utilize the training data to detect bounding boxes in an image and tune the model (e.g., adjust the weights of the neurons) to output the known classification of the corresponding input training data. In some examples, the model trainer 116 trains either or both models using a first group of the training data for initial training, and tests the initially trained model with a second group of the training data. If the number and/or percentage of misclassifications is above a threshold, the model trainer 116 will use a third group of the training data to further train and/or tune the model until the efficacy of the model increases above a threshold. The training/testing phases may occur any number of times with any number of training data groupings. At block 308 (e.g., after the efficacy of the models satisfies one or more thresholds), the model trainer 116 stores trained model data corresponding to implementation of the trained models in the storage device(s) 114 and/or deploys the model training data to another device via the interface 111.

FIG. 4 is an example flowchart representative of machine readable instructions 400 that may be executed to implement the example invoice decoder 110 of FIG. 1 to decode invoices. Although the instructions 400 are described in conjunction with the example invoice decoder 110 of FIG. 1, the instructions 400 may be implemented in conjunction with any type of invoice decoder. Additionally, although the instructions 400 of FIG. 4 are described in conjunction with decoding invoices, the instructions 400 may be implemented in conjunction with an image of any object that includes text.

At block 402, the image resizer 112 determines if a new image has been obtained via the example interface 111 (e.g., from a user device that has captured the image and transmitted the image to the invoice decoder 110 via a network communication). As described above, if the example invoice decoder 110 is implemented in a device that captured the image (e.g., in the example computing device 101 of FIG. 1), the interface 111 can obtain the new image from other components of the device (e.g., directly from the sensor, from storage, etc.) If the example image resizer 112 determines that a new image has not been obtained (block 402: NO), control returns to block 402 until an image is obtained. If the example image resizer 112 determines that a new image has been obtained (block 402: YES), the example OCR 115 performs an OCR function on the image to identify text of the image (block 404). For example, the OCR 115 converts the text in an image to machine-encoded text that is organized into words by generating bounding boxes (e.g., word bounding boxes, bounding boxes of the words, etc.) around identified text characters. At block 405, the example image resizer 112 resizes the image to a preset size.

At block 406, the example model executor 118 utilizes or otherwise applies an AI-based model (e.g., the convolutional neural network 200 of FIG. 2A) over the image to detect columns in tables. For example, the model executor 118 inputs the image and generates outputs columns using the trained region-based convolutional neural network 200. That is, the model executor 118 detects the columns by inputting the image into the RPN 202 and the classifier 204 to generate the identified columns. At block 408, the example row/cell identifier 120 identifies the rows and/or cells included in the table, as further described below in conjunction with FIG. 5. The example row/cell identifier 120 outputs a table with a sorted list of words at each cell, including words in a first row (e.g., column headers). At block 410, the example model executor 118 uses a column type classification model to classify the columns based on column categories. For example, the model executor 118 inputs the text of the column headers into the trained column type classification model 210 to generate output column category classifications of the columns, as further described above in conjunction with FIG. 2B. The example model executor 118 flags the text included in a column as corresponding to the identified column category for the column. For example, the model executor 118 assigns the text in the column headers to a category of interest (e.g., item description item quantity, item total price, etc.) or an "out of scope" class.

At block 411, the example report generator 122 links information corresponding to the identified rows and/or cells to the corresponding column categories. For example, if the text in a row includes (a) "Whiskey" in a column detected as corresponding to product identifier and (b) the number '3' in a column detected as corresponding to total number of items purchased, the report generator 122 links the amount of '3' to the total number of items purchased for the whiskey product.

At block 412, the example report generator 122 generates an invoice decoding report indicating the information decoded from the invoice (e.g., the linked information from the rows/cells and the corresponding detected columns). The report may include the image, and text corresponding to identified headers included in the image. The report may also include any other information corresponding to the image (e.g., user entered information, metadata, etc.). At block 414, the example interface 111 stores and/or transmits (e.g., causes the network interface 106 to transmit) the report. For example, the report generator 122 may store the report in the storage device(s) 114, utilize the interface 111 to display the report on a user interface (e.g., of the classifying server 105, the computing device(s) 101, the image server(s) 102, etc.), and/or may be use the network interface 106 to transmit the report to a device that sent the input image via a network using the network interface 106 (e.g., to cause the device to store the report locally or display the report locally). In some examples, the report is stored in conjunction with the device that captured the image, other information extracted from the image and/or provided by the user that obtained the image, metadata included in the image, etc. For example, if the invoice corresponds to a particular location, company, time, user, etc. (e.g., based on extracted data, user provided data, and/or metadata), the report generator 122 may store the report in conjunction with other reports that correspond to the same information.

FIG. 5 is an example flowchart representative of machine readable instructions 408 that may be executed to implement the example invoice decoder 110 of FIG. 1 to identify rows and cells in tables, as described above in conjunction with block 408 of FIG. 4. Although the instructions 408 are described in conjunction with the example invoice decoder 110 of FIG. 1, the instructions 408 may be described in conjunction with any type of invoice decoder.

At block 502, the example row/cell identifier 120 sorts region bounding boxes of the detected columns horizontally. As described above, the example model executor circuitry 118 can apply a column detection model to the image. The column detection model generates region bounding boxes representing regions of interest and classifies the region bounding boxes and columns or non-columns. The column detection model outputs detected columns represented by column bounding boxes. The row/cell identifier 120 sorts the column bounding boxes horizontally. At block 504, the example row/cell identifier 120 groups word bounding boxes by the column that the words belong to. For example, the row/cell identifier 120 determines that a word is within a column when their respective bounding boxes overlap at least 75%. At block 506, the example row/cell identifier 120 sorts the words in the respective columns vertically (e.g., using the Y coordinate of the centroid of the word). At block 508, the example row/cell identifier 120, for the respective columns, iterates through the sorted words to find numbers (e.g., words that include or otherwise are numbers (e.g., integers or floats)). The example row/cell identifier 120 stores the Y of the centroid for respective words in a temporary variable to detect different rows of the table.

At block 510, the example row/cell identifier 120 counts the number of occurrences of the numbers in each column to determine the mode (e.g., the most repeated value among columns, which corresponds to the number of rows of the table). At block 512, the example row/cell identifier 120 estimates the slope of each row (e.g., based on the pixels of the image) using the median of the slope of the most representative columns (e.g., the columns that contain the mode in rows). At block 514, the example row/cell identifier 120 determines the boundaries of each cell by intersecting respective regions of the columns and the rows. The example row/cell identifier 120 determines the row boundaries using the computed slopes. For respective columns, the closest column with the targeted number of rows is used as a reference for the boundary coordinates.

At block 516, the example row/cell identifier 120, for respective cells, extracts text in the cells by concatenating all the words that are within the cell boundaries. In some examples, the row/cell identifier 120 determines that a word is inside of a cell if the Y-coordinate of its centroid is inside the vertical limits. In some examples, prior to concatenating the words, the example row/cell identifier 120 sorts the words in the XY plane using, for example, the median height of the words as the estimate of the line height for grouping the words horizontally. At block 518, the example row/cell identifier 120 determines a header of the columns in the table by searching for a first row of the table without numbers. In some examples, the example row/cell identifier 120 determines that the rest of the rows are those that contain at least one number in one of the columns. The example row/cell identifier 120 outputs a table with the sorted list of words at each cell.

Figure 6:
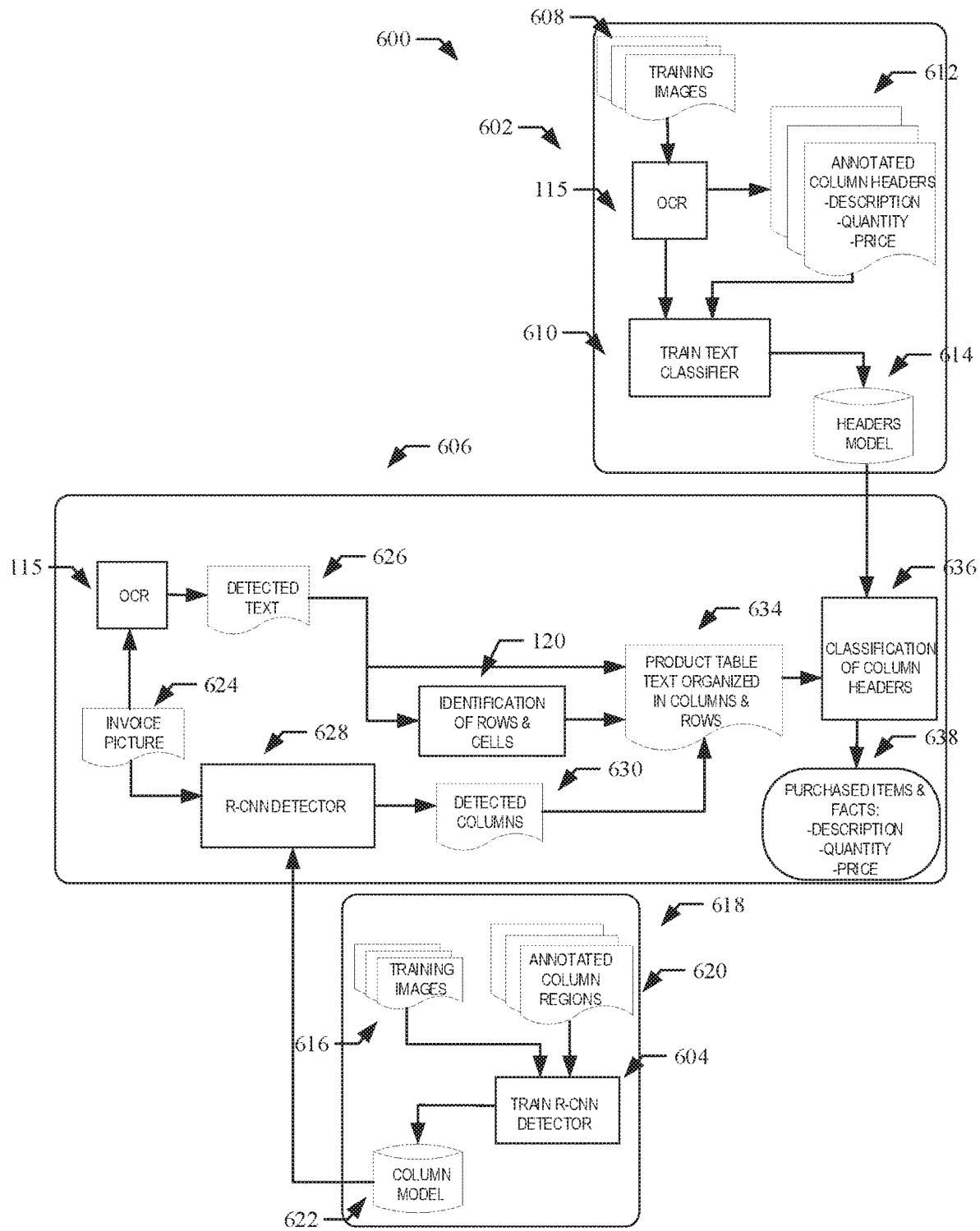
FIG. 6 illustrates a diagram for automated invoice decoding based on deep learning for tabular text recognition.

FIG. 6 illustrates an example diagram 600 for automated invoice decoding based on deep learning for tabular text recognition. The example diagram includes an example train header classification block 602, an example train column detection block 604, and an example automated invoice decoding block 606. The example diagram 600 includes the example train column detection block 604 and the example train header classification block 602 that illustrates how the model trainer 116 of FIG. 1 may train the column detection model and the header/column type classification model.

The example train header classification block 602 of FIG. 6 (e.g., implemented by the example invoice decoder 110 of FIG. 1) includes example training images 600 that are input into the example OCR 115 of FIG. 1. The OCR 115 converts the text of the image to machine readable text. An example train text classifier 610 (e.g., implemented by the model trainer 116 of FIG. 1) trains a model to classify the text into particular column headers set forth in the example annotated column headers 612. In this manner, a trained model can classify headers based on input images. The trained models are stored in an example headers model storage 614 (e.g., implemented by the example storage device(s) 114).

The example train column detection block 604 of FIG. 6 using example training images 616 (e.g., images with known, labelled columns) and example annotated column regions 618 to train the R-CNN detector 620 (e.g., the example convolutional neural network 200 trained by the example model trainer 116) to detect columns from an image. The trained models are stored in an example column model 622 (e.g., implemented by the example storage device(s) 114).

After the trained models are implemented (e.g., at the example R-CNN detector 628 and the example classification column headers 636), an example input image 115 of an invoice, a receipt, etc. is processed by the invoice decoder 110. For example, the OCR 115 OCRs the image to generate detected text to send to the header classification model 636. Additionally, the R-CNN detector 628 identifies columns in the image and the example row/cell identifier 120 identifies the row and/or cells of the columns identified by the column detection model, thereby resulting in an example product table text organized in columns and rows 634. The product table text 634 is input into the header classification model 636, which identifies the header categories of interest and links the corresponding text information to the identified categories. The output 638 is a report that may be stored and/or transmitted to another device.

Figure 7:
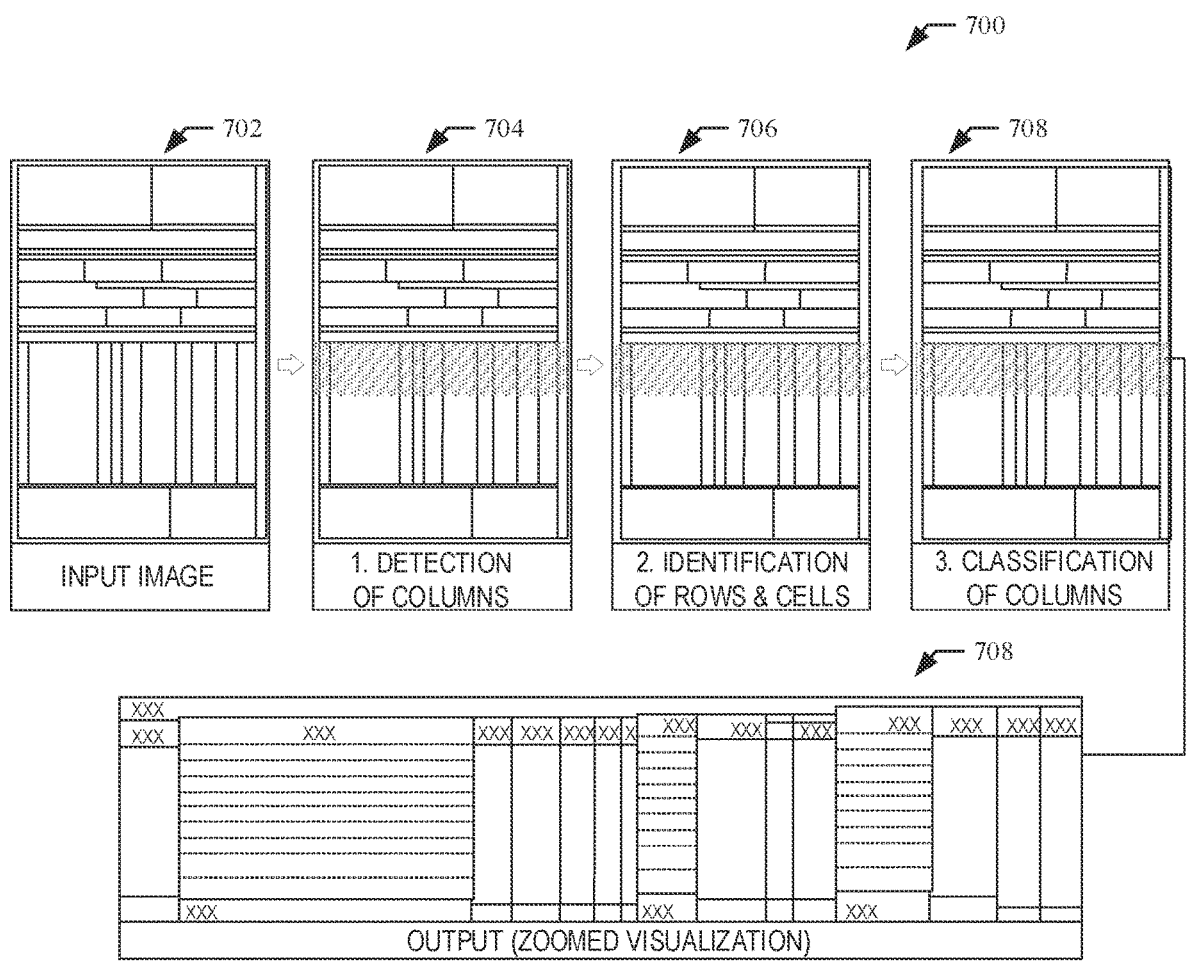
FIG. 7 illustrates a flow of the invoice decoder of FIG. 1 with respect to an example image of an invoice.

FIG. 7 illustrates an example flow 700 of the invoice decoder 110 with respect to an example image of an invoice. The flow starts in response to an example input image 702 being accessed. The example invoice decoder 110 detects the columns as shown in the example image 704. After the columns are detected, the example invoice decoder 110 identifies the rows and cells within the identified columns as shown in the example image 706. After the rows and cells are generated, the invoice decoder 110 classifies the columns based on header information, which is illustrated in the output image 708, which may be included in the report.

Figure 8:
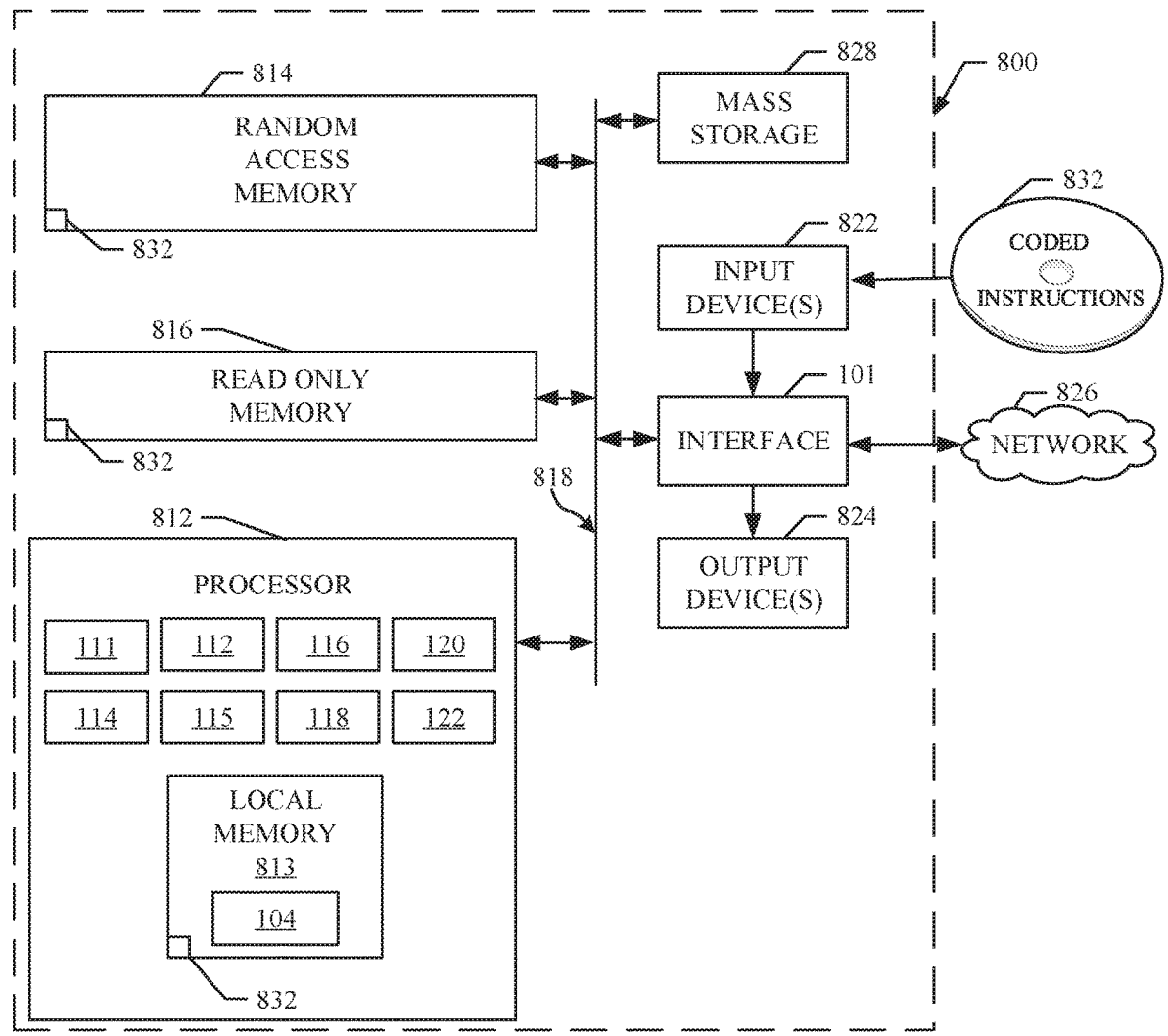
FIG. 8 is a block diagram of an example processing platform structured to execute the instructions of FIGS. 3-5 to implement the example invoice decoder of FIG. 1.

FIG. 8 is a block diagram of an example processor platform 800 structured to execute the instructions of FIGS. 3-5 to implement the invoice decoder 110 of FIG. 1. The processor platform 800 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image resizer 112, the example model trainer 116, the example model executor 118, the example row/cell identifier 120, and the example report generator 122.

The processor 812 of the illustrated example includes a local memory 813 (e.g., a cache). In this example, the local memory 813 implements the example storage device(s) 114. However, the example volatile memory 814 and/or the example non-volatile memory 816 may implement the storage device(s) 114. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 111. The interface circuit 111 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 111. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 111 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 111 of the illustrated example, thus, typically includes a graphics driver card, a graphics driver chip, and/or a graphics driver processor.

The interface circuit 111 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3-5 may be stored in the mass storage device 828, in the volatile memory 814, in the non-volatile memory 816, and/or on a removable non-transitory computer readable storage medium such as a CD or DVD.

Example methods, apparatus, systems, and articles of manufacture to decode documents based on images using artificial intelligence are disclosed herein. Further examples and combinations thereof include the following: Example 1 includes an apparatus comprising a model executor to input an image into a first artificial intelligence (AI)-based model to detect columns of text in the image, and input the image into a second AI-based model to classify the detected columns into categories, a cell identifier to identify of rows of a table or cells in the detected columns, and a report generator to link information corresponding to the rows of the table or cells in the detected columns with corresponding categories, and generate a report based on the linked information.

Example 2 includes the apparatus of example 1, further including an optical code reader to convert text in the image to machine-encoded text, and generate bounding boxes for words of machine-encoded text.

Example 3 includes the apparatus of example 2, wherein to identify the rows of the table or cells in the detected columns, the cell identifier is to sort the bounding boxes of the detected columns, group the bounding boxes of the words by respective columns, sort words in respective columns vertically, identify first words that include numbers, and count a number of occurrences of the first words in a column to determine a number of rows in the image.

Example 4 includes the apparatus of example 3, wherein to identify the rows of the table or cells in the detected columns, the cell identifier is to determine boundaries of cells by intersecting first regions corresponding to the detected columns with second regions corresponding the rows, extract text in boundaries of respective cells by concatenating the words within the respective cells, and link the extracted text to a respective cell and a respective row.

Example 5 includes the apparatus of example 1, wherein the categories identify a type of information included in the detected columns.

Example 6 includes the apparatus of example 1, wherein the first AI-based model is a region-based convolutional neural network.

Example 7 includes the apparatus of example 1, further including an interface to transmit the report to a user interface.

Example 8 includes the apparatus of example 1, further including storage to store the report.

Example 9 includes a non-transitory computer readable storage medium comprising instructions which, when executed, cause one or more processors to at least input an image into a first artificial intelligence (AI)-based model to detect columns of text in the image, and input the image into a second AI-based model to classify the detected columns into categories, identify rows of a table or cells in the detected columns, and link information corresponding to the rows of the table or cells in the detected columns with corresponding categories, and generate a report based on the linked information.

Example 10 includes the non-transitory computer readable storage medium of example 9, wherein the instructions cause the one or more processors to convert text in the image to machine-encoded text, and generate bounding boxes for words of machine-encoded text.

Example 11 includes the non-transitory computer readable storage medium of example 10, wherein the instructions cause the one or more processors to identify the rows of the table or cells in the detected columns by sorting the bounding boxes of the detected columns, grouping the bounding boxes of the words by respective columns, sorting words in respective columns vertically, identifying first words that include numbers, and counting a number of occurrences of the first words in a column to determine a number of rows in the image.

Example 12 includes the non-transitory computer readable storage medium of example 11, wherein the instructions cause the one or more processors to identify the rows of the table or cells in the detected columns by determining boundaries of cells by intersecting first regions corresponding to the detected columns with second regions corresponding the rows, extracting text in boundaries of respective cells by concatenating the words within the respective cells, and linking the extracted text to a respective cell and a respective row.

Example 13 includes the non-transitory computer readable storage medium of example 9, wherein the categories identify a type of information included in the detected columns.

Example 14 includes the non-transitory computer readable storage medium of example 9, wherein the first AI-based model is a region-based convolutional neural network.

Example 15 includes the non-transitory computer readable storage medium of example 9, wherein the instructions cause the one or more processors to transmit the report to a user interface.

Example 16 includes the non-transitory computer readable storage medium of example 9, wherein the instructions cause the one or more processors to store the report into storage.

Example 17 includes a method comprising detecting, using a first artificial intelligence (AI)-based model, columns of text in an image, and classifying, using a second AI-based model, the detected columns of the image into categories, identifying, by executing an instruction with a processor, rows of a table or cells in the detected columns, and linking, by executing an instruction with the processor, information corresponding to the rows of the table or cells in the detected columns with corresponding categories, and generating, by executing an instruction with the processor, a report based on the linked information.

Example 18 includes the method of example 17, further including converting text in the image to machine-encoded text, and generating bounding boxes for words of machine-encoded text.

Example 19 includes the method of example 18, wherein the identifying of the rows of the table or cells in the detected columns includes sorting the bounding boxes of the detected columns, grouping the bounding boxes of the words by respective columns, sorting words in respective columns vertically, identify first words that include numbers, and counting a number of occurrences of the first words in a column to determine a number of rows in the image.

Example 20 includes the method of example 19, wherein the identifying of the rows of the table or cells in the detected columns includes determining boundaries of cells by intersecting first regions corresponding to the detected columns with second regions corresponding the rows, extracting text in boundaries of respective cells by concatenating the words within the respective cells, and linking the extracted text to a respective cell and a respective row.

Example 21 includes the method of example 17, wherein the categories identify a type of information included in the detected columns.

Example 22 includes the method of example 17, wherein the first AI-based model is a region-based convolutional neural network.

Example 23 includes the method of example 17, further including transmitting the report to a user interface.

Example 24 includes the method of example 17, further including storing the report into storage.

From the foregoing, it will be appreciated that example methods, apparatus and articles of manufacture have been disclosed that decode documents based on images using artificial intelligence. The disclosed methods, apparatus and articles of manufacture are able to decode images of invoices and/or receipts more efficiently than traditional techniques for lower quality images. Accordingly, examples disclosed herein can decode documents (e.g., invoice, receipts, etc.) with variable formats and/or variable appearance and/or perspective (e.g., taken from a mobile phone), thereby automating the pipeline of document decoding to reduce manual burden, gain efficiencies in the collection process, etc. Because there is a high volume of lower quality images than the volume of scanned images for invoices, examples disclosed herein can more effectively digitally decode invoices due to the higher efficiency and efficacy of examples disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine readable instructions; and
   programmable circuitry to execute the machine readable instructions to at least:
   input an image into a first artificial intelligence (AI)-based model to detect columns of a table in the image, wherein the columns are to be represented by first bounding boxes;
   sort the columns horizontally based on coordinates of the first bounding boxes;
   group second bounding boxes by column based on overlap between ones of the first bounding boxes and ones of the second bounding boxes, the second bounding boxes corresponding to words in the table;
   sort ones of the words in respective columns vertically based on respective coordinates of the second bounding boxes;
   identify rows of the table within the detected columns based on occurrences of numbers in ones of the first bounding boxes;

identify cells within the detected columns, the cells to be identified at intersections of respective ones of the rows and the columns;
identify a first row of the rows, the first row including first cells of the cells;
input the first cells of the cells into a second AI based model to classify the detected columns into categories;
link information corresponding to the cells in the detected columns with corresponding categories; and
generate a report based on the linked information.

2. The apparatus of claim 1, wherein the programmable circuitry is to:
convert text detected in the image to machine-encoded text, the machine-encoded text to include the words; and
generate the second bounding boxes for the words of the machine-encoded text.

3. The apparatus of claim 2, wherein the programmable circuitry is to identify the rows of the table by executing the instructions to:
identify first words that include at least one number;
count a number of occurrences of the first words in respective ones of the columns to determine an amount of the rows to identify, the amount of the rows to correspond to a mode number of occurrences; and
determine slopes of the rows based on ones of the columns that include the mode number of occurrences.

4. The apparatus of claim 3, wherein the programmable circuitry is to identify the cells within the detected columns by executing the instructions to:
determine boundaries of the cells by intersecting first regions corresponding to the first bounding boxes with second regions corresponding the rows; and
extract text from the cells by concatenating ones of the words within respective cells.

5. The apparatus of claim 1, wherein the categories identify a type of information included in the detected columns.

6. The apparatus of claim 1, wherein the first AI-based model is a region-based convolutional neural network.

7. The apparatus of claim 1, wherein the programmable circuitry is to transmit the report for display.

8. The apparatus of claim 1, wherein the programmable circuitry is to store the report.

9. A non-transitory computer readable storage medium comprising instructions to cause one or more processors to at least:
detect columns in a table in an image by applying a first artificial intelligence (AI)-based model to the image, the columns to be represented by respective column
horizontally order the column bounding boxes;
assign word bounding boxes corresponding to words detected in the table to respective columns based on coordinates of the word bounding boxes and coordinates of the column bounding boxes;
sort the words in the columns vertically;
identify rows of the table relative to the detected columns based on occurrences of numbers in ones of the word bounding boxes;
identify cells of the table;
identify a first of row of the table, the first row including first cells of the cells representing headers of the detected columns;
input the first cells of the cells into a second AI-based model to classify the detected columns into categories;
link information corresponding to the rows of the table or cells in the detected columns with corresponding categories; and
generate a report based on the linked information.

10. The non-transitory computer readable storage medium of claim 9, wherein the instructions are to cause the one or more processors to:
convert text detected in the image to machine-encoded text, the machine-encoded text to include the words; and
generate the word bounding boxes for the words of identified in the machine-encoded text.

11. The non-transitory computer readable storage medium of claim 10, wherein the instructions are to cause the one or more processors to
identifying first words that include the numbers;
counting a number of occurrences of the first words in the columns;
identifying one or more first columns having a highest amount of the first words, the highest amount of the first words to correspond to an amount of columns to identify; and
determining boundaries of the rows based on a slopes of pixel data in ones of the rows in the first columns.

12. The non-transitory computer readable storage medium of claim 11, wherein the instructions are to cause the one or more processors to identify the rows of the table or cells in the detected columns by:
determining boundaries of cells by intersecting first regions corresponding to the detected columns with second regions corresponding the rows;
extracting text in boundaries of respective cells by concatenating the words within the respective cells; and
linking the extracted text to a respective cell and a respective row.

13. The non-transitory computer readable storage medium of claim 9, wherein the categories identify a type of information included in the detected columns.

14. The non-transitory computer readable storage medium of claim 9, wherein the first AI-based model is a region-based convolutional neural network.

15. The non-transitory computer readable storage medium of claim 9, wherein the instructions are to cause the one or more processors to transmit the report for display.

16. The non-transitory computer readable storage medium of claim 9, wherein the instructions are to cause the one or more processors to store the report.

17. A method comprising:
detecting, using a first artificial intelligence (AI)-based model, columns in a table in an image, the columns to be defined by respective coordinates of respective first bounding boxes;
horizontally sorting the detected columns based on the coordinates of the first bounding boxes;
grouping second bounding boxes corresponding to detected words in the table by column, the grouping of the second bounding boxes to be based on coordinates of the second bounding boxes;
vertically sorting words in respective columns;
identifying, by executing an instruction with a processor, rows of the table relative to the detected columns based on occurrences of numerals in the vertically sorted words;
identifying, by executing an instruction with the processor, cells at intersections of the rows and the columns;

identifying headers of the detected columns, the headers corresponding to a first row of the rows that does not include a number;

classifying, using a second AI-based model, the detected columns into categories based on the headers;

linking, by executing an instruction with the processor, information corresponding to the cells in the detected columns with corresponding categories; and generating, by executing an instruction with the processor, a report based on the linked information.

18. The method of claim 17, further including:

converting text detected in the image to machine-encoded text, the machine-encoded text to include the words; and generating the second bounding boxes for the words.

19. The method of claim 18, wherein the identifying of the rows of the table or cells in the detected columns includes:

identifying first words that include the numbers;

counting a number of occurrences of the first words in ones of the columns to determine a target number of rows in the table; and determining boundaries of the rows based on a slopes of row pixel data in columns having the target number of the rows.

20. The method of claim 19, wherein the identifying of the rows of the table includes:

determining boundaries of the cells by intersecting first regions corresponding to the detected columns with second regions corresponding the rows;

extracting text in the boundaries of the cells by concatenating ones of the words within respective ones of the cells; and linking the extracted text to a respective cell and a respective row.

* * * * *